United States Patent

[11] 3,620,978

| [72] | Inventor | Earl P. Moore, Jr.<br>Wilmington, Del. |
|---|---|---|
| [21] | Appl. No. | 745,715 |
| [22] | Filed | July 18, 1968 |
| [45] | Patented | Nov. 16, 1971 |
| [73] | Assignee | E. I. du Pont de Nemours and Company<br>Wilmington, Del. |

[54] PROCESS FOR PREPARING STABLE POSITIVELY CHARGED ALUMINA-COATED SILICA SOLS
2 Claims, No Drawings

[52] U.S. Cl. ..................................... 252/313, 117/100
[51] Int. Cl. ..................................... B01j 13/00, B44d 1/18
[50] Field of Search ........................................... 252/313, 313 S

[56] References Cited
UNITED STATES PATENTS

| 2,630,410 | 3/1953 | Clapsadle et al. | 252/313 |
| 3,007,878 | 11/1961 | Alexander et al. | 252/313 |
| 3,252,917 | 5/1966 | Mindick et al. | 252/313 |

Primary Examiner—Richard D. Lovering
Attorney—Norbert F. Reinert

ABSTRACT: Improved positively charged coated silica particles have been prepared by reacting boric acid stabilized basic aluminum acetate with a silica sol.

PROCESS FOR PREPARING STABLE POSITIVELY CHARGED ALUMINA-COATED SILICA SOLS

BACKGROUND OF THE INVENTION

Positively charged coated silica particles are known to the art as first disclosed in U.S. Pat. No. 3,007,878 to Alexander and Bolt. These novel positively charged coated silica particles have a variety of unique properties. However, stability has presented problems which limited their commercial manufacture.

A method has been proposed to increase the stability of these positively charged particles as represented by U.S. Pat. No. 3,252,917 to Mindick and Thompson. While this patent discloses a new technique for preparing these positively charged particles it is costly and time-consuming.

SUMMARY OF THE INVENTION

It has been discovered that stable aquasols of positively charged coated silica particles can be prepared by mixing an aqueous silica sol with a stabilized basic aluminum acetate or formate. The aluminum composition is stabilized with boric acid. The boric acid is present to control the hydrolysis of aqueous solutions of basic aluminum acetate or formate. When the stabilized aluminum composition and the colloidal silica are mixed, it is believed the boric acid stabilizes the aluminum coating on the silica surface. In any event, a more stable aluminum-coated silica particle is obtained when the boric acid stabilized basic aluminum compositions are used in preparing the positively charged silica particles.

DESCRIPTION OF THE INVENTION

Silica aquasols are now readily available which may be made by a variety of processes. Typical processes for preparing these silica aquasols are those such as disclosed in Bechtold and Snyder U.S. Pat. No. 2,574,902, Rule U.S. Pat. No. 2,577,485 and White U.S. Pat. No. 2,285,477. Ordinarily, the sols are stabilized by the presence of a small amount of alkali such as sodium hydroxide and are commercially available in a variety of silica contents such as 20–40 percent $SiO_2$.

The silica sol used in this process can first be deionized by a single pass through a resin column containing a strong cationic exchange resin and a weak anionic exchange resin. This deionization treatment is not essential but may prove useful in preparing the positively charged coated silica particles of this invention.

The stabilized basic aluminum acetate or formate is dissolved in water to facilitate mixing with the silica sols. Generally, a 20–40 percent by weight stabilized basic aluminum acetate solution is sufficient for the process of this invention.

The stabilizing compounds are preferably of the formula $Al_4(OH)_xYBO12._{7F-x}\cdot ZH_3BO_3$ where $x$ is 8 to 11, Y is acetate or formate and Z is one-half to 3.

The aqueous solution of the stabilized basic aluminum acetate is added to the silica sol with vigorous agitation to insure complete mixing of the ingredients. The average colloidal silica particle size in the sol is about 5 millimicrons to 150 microns. The specific surface area of the silica sol is predetermined for instance by nitrogen absorption and enough aluminum solution is added to give a final product having a mol ratio of aluminum to surface silica groups of about 1 to 4 to 3 to 1 and preferably 0.5 to 1 to 2 to 1. Upon stirring a clear stable sol is formed. The pH of this sol is usually about 4.2 to 5.

Concentration of the final aluminum-coated silica particles is usually between 15 through 50 percent solids. Preferably these solids range is about 20 to 40 percent by weight. These particles stabilized with the boric acid containing aluminum compositions should give excellent long term stability to precipitation of the silica or gel formation.

Other stabilizers for the basic aluminum formate and acetate compositions may be utilized. Such stabilizers can be urea, thiourea and organic acids such as adipic and succinic acid. However, the basic aluminum formate and acetate compositions stabilized with these additional stabilizers are not readily available and the effect of other stabilizers upon the water solubility of the basic aluminum composition must be considered.

The following examples will better illustrate the process of the present invention.

EXAMPLE 1

A silica sol ("Ludox" SM Colloidal Silica) containing 30 percent $SiO_2$ by weight, the silica particles having a specific surface area of about 375 m.$^2$/g. of $SiO_2$ as determined by nitrogen absorption is deionized with a single pass through a column containing "Dowex" 50 strong (H) resin and "Rexyn" 203 weak (OH) resin. The pH of the deionized silica sol is approximately 3.1. 400 g. of the deionized silica sol is mixed with 305 g. of a 27.7 percent freshly prepared solution of basic aluminum acetate ("Niaproof" $Al(OH)_2(CH_3COO)\cdot\frac{1}{3}H_3BO_3$) by means of a blender. The resulting clear and stable sol contains approximately 17.0 percent $SiO_2$ and 4.3 percent $Al_2O_3$ corresponding to a mol ratio of aluminum to surface silica groups of 1:1. The pH of this sol is approximately 4.5.

EXAMPLE 2

400 g. of a silica sol ("Ludox" SM Colloidal Silica) containing 30 percent $SiO_2$ by weight, the silica particles having a specific surface area of about 375 m.$^2$/g. of $SiO_2$ as determined by nitrogen absorption, is mixed with 246 g. of a freshly prepared 35 percent basic aluminum acetate solution ("Niaproof" $Al(OH)_2(CH_3COO)\cdot\frac{1}{3}H_3BO_3$) by means of a blender. The resulting clear and stable sol contains approximately 18.5 percent $SiO_2$ and 4.9 percent $Al_2O_3$ corresponding to a mol ratio of aluminum to surface silica groups of 1:1. The pH of this approximately 5.0.

The pH of the above sol is adjusted with acetic acid from 5.0 to 4.6 to give increased stability.

EXAMPLE 3

A silica sol ("Ludox" HS-40 Colloidal Silica) containing 40 percent $SiO_2$ by weight, the silica particles having a specific surface area of about 230 m.$^2$/g. of $SiO_2$ as determined by nitrogen absorption is first deionized with a single pass through a column containing "Dowex" 50 strong (H) resin and "Rexyn" 203 weak (OH) resin. The initial pH of the deionized silica sol is approximately 3.2 but rises over a period of 18 hours to approximately pH 5.5 at which point it is redeionized with "Dowex" 50 strong (H) resin to a pH of 2.5–2.7. 400 g. of the deionized silica sol is mixed with 224 g. of the 27.7 percent basic aluminum acetate solution of example 1 by means of a blender. The resulting clear and stable sol contains approximately 25.6 percent $SiO_2$ and 3.5 percent $Al_2O_3$ corresponding to a mol ratio of aluminum to surface silica groups of 1:1. The pH of this sol is approximately 4.5.

EXAMPLE 4

200 g. of a silica sol ("Ludox" HS–40 Colloidal Silica) containing 40 percent $SiO_2$ by weight, the silica particles having a specific surface area of about 230 m.$^2$/g. of $SiO_2$ as determined by nitrogen absorption is mixed with 135 g. of a freshly prepared 35 percent basic aluminum acetate solution ("Niaproof" $Al(OH)_2(CH_3COO)\cdot\frac{1}{2}H_3BO_3$) by means of a blender. The resulting clear and stable sol contains approximately 23.8 percent $SiO_2$ and 5.1 percent $Al_2O_3$, corresponding to a mol ratio of aluminum to surface silica groups of 3:2. The pH of the sol is approximately 4.85.

EXAMPLE 5

400 g. of a silica sol ("Ludox" LS Colloidal Silica) containing 30 percent $SiO_2$ by weight, the silica particles having a specific surface area of about 205 m.$^2$/g. of $SiO_2$ as determined by nitrogen absorption, is mixed with 168 g. of the 27.7 percent basic aluminum acetate solution of Example 1, by means of a blender. The resulting clear and stable sol contains approximately 21.1 percent $SiO_2$ and 2.7 percent $Al_2O_3$, corresponding to a mol ratio of aluminum to surface silica groups of 1:1. The pH of the sol is approximately 4.4.

EXAMPLE 6

200 g. of a silica sol ("Ludox" HS–40 Colloidal Silica) containing 40 percent $SiO_2$ by weight, the silica particles having a specific surface area of about 230 m.$^2$/g. of $SiO_2$ as determined by nitrogen absorption is mixed with 135 g. of a freshly prepared 35 percent basic aluminum acetate solution by means of a blender. The basic aluminum acetate solution contains 20.5 percent boric acid by weight and corresponds to a formula of $Al(OH)_2(CH_3COO)\cdot\frac{1}{2}H_3BO_3$. The resulting clear and stable sol contains approximately 23.8 percent $SiO_2$ and 5.1 percent $Al_2O_3$ corresponding to a mol ratio of aluminum to surface silica groups of 3:2. The pH of the sol is approximately 4.8.

EXAMPLE 7

A silica sol ("Ludox" SM Colloidal Silica) containing 30 percent $SiO_2$ by weight, the silica particles having a specific surface area of about 375 m.$^2$/g. of $SiO_2$ as determined by nitrogen absorption is deionized with a single pass through a column containing "Dowex" 50 strong (H) resin and "Rexyn" 203 weak (OH) resin. The pH of the deionized silica sol is approximately 3.1. 350 g. of the deionized silica sol is mixed with 328 g. of a dibasic aluminum formate by means of a blender. The dibasic aluminum formate solution had an aluminum content as $Al_2O_3$ of 8.5 percent and corresponds to the formula $Al(OH)_2(HCO_2\cdot\frac{1}{3}H_3BO_3$. The resulting clear and stable sol contains approximately 15.6 percent $SiO_2$ and 4.1 percent $Al_2O_3$ corresponding to a mol ratio of aluminum to surface silica groups of 1:1. The pH of this sol is approximately 4.7.

EXAMPLE 8

350 g. of a silica sol ("Ludox" LS Colloidal Silica) containing 30 percent $SiO_2$ by weight, the silica particles having a specific surface area of about 205 m.$^2$/g. of $SiO_2$ as determined by nitrogen absorption, is mixed with 208 g. of the dibasic aluminum formate solution of example 7, by means of a blender. The resulting clear and stable sol contains approximately 18.8 percent $SiO_2$ and 3.1 percent $Al_2O_3$, corresponding to a mol ratio of aluminum to surface silica groups of 1:1. The pH of the sol is approximately 4.9.

EXAMPLE 9

A silica sol ("Ludox" HS–40 Colloidal Silica) containing 40 percent $SiO_2$ by weight, the silica particles having a specific surface area of about 230 m.$^2$/g. of $SiO_2$ as determined by nitrogen absorption is first deionized with a single pass through a column containing "Dowex" 50 strong (H) resin and "Rexyn" 203 weak (OH) resin. The initial pH of the deionized silica sol is approximately 3.2 but rises over a period of 18 hours to approximately pH 5.5 at which point it is redeionized with "Dowex" 50 strong (H) resin to a pH of 2.5–2.7. 400 g. of the deionized silica sol is mixed with 275 g. of the dibasic aluminum acetate solution of example 7 by means of a blender. The resulting clear and stable sol contains approximately 23.7 $SiO_2$ and 3.4 percent $Al_2O_3$ corresponding to a mol ratio of aluminum to surface silica groups of 1:1. The pH of this sol is approximately 4.7.

What is claimed is:

1. In a process for preparing positively charged alumina-coated silica particles from a silica sol the improvement which comprises mixing with said silica sol a boric acid stabilized basic aluminum compound of the formula

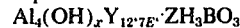

where $x$ is 8 to 11, Y is acetate or formate and Z is one-half to 3, said aluminum compound being added in an amount to give an aluminum-to-surface silica mol ratio of about 0.5 to 1 to 2 to 1.

2. A process as in claim 1 where said silica is deionized before being mixed with said aluminum compound.

* * * * *

PO-1050
(5/69)

UNITED STATES PATENT OFFICE
CERTIFICATE OF CORRECTION

Patent No. 3,620,978      Dated November 16, 1971

Inventor(s) Earl P. Moore, Jr.

It is certified that error appears in the above-identified patent and that said Letters Patent are hereby corrected as shown below:

Column 1, line 54 "$Al_4(OH)_x YBQ12,_{7E}, ZH_3BO_3$" should be

-- $Al_4(OH)_x Y_{12-x} \cdot ZH_3BO_3$ --.

Column 4, line 31 "$Al_4(OH)_x Y12,_{7E}, ZH_3BO_3$" should be

-- $Al_4(OH)_x Y_{12-x} \cdot ZH_3BO_3$ --.

Signed and sealed this 6th day of February 1973.

(SEAL)
Attest:

EDWARD M. FLETCHER, JR.
Attesting Officer

ROBERT GOTTSCHALK
Commissioner of Patents